(12) United States Patent
Gyöngyösi et al.

(10) Patent No.: US 7,156,230 B2
(45) Date of Patent: Jan. 2, 2007

(54) DEVICE FOR HOLDING HOSE CLAMPS IN A PREDETERMINED POSITION

(75) Inventors: Jürgen Gyöngyösi, Hanau (DE); Michael Hauke, Wächtersbach (DE)

(73) Assignee: Rasmussen GmbH, Maintal (DE)

( * ) Notice: Subject to any disclaimer, the term of this patent is extended or adjusted under 35 U.S.C. 154(b) by 244 days.

(21) Appl. No.: 10/653,877

(22) Filed: Sep. 3, 2003

(65) Prior Publication Data
US 2004/0111840 A1 Jun. 17, 2004

(30) Foreign Application Priority Data
Sep. 6, 2002 (DE) ................ 102 41 221

(51) Int. Cl.
*B65D 85/00* (2006.01)
(52) U.S. Cl. .................. 206/338; 206/445; 285/23
(58) Field of Classification Search .................. 285/23, 285/24, 27; 206/338, 348, 445; 24/462, 24/570
See application file for complete search history.

(56) References Cited

U.S. PATENT DOCUMENTS

| 354,234 | A | * | 12/1886 | Richards ...................... 206/338 |
| 1,291,810 | A | * | 1/1919 | Elliott ......................... 206/341 |
| 3,243,220 | A | | 6/1964 | Karas |
| 4,821,877 | A | * | 4/1989 | Aab et al. .................... 206/338 |
| 4,951,363 | A | * | 8/1990 | Takahashi et al. ........... 24/20 R |
| 5,013,238 | A | * | 5/1991 | Sterrett et al. ................. 433/2 |
| 5,620,209 | A | * | 4/1997 | Sauer ........................... 285/23 |
| 6,095,584 | A | * | 8/2000 | Walsh et al. ................. 294/166 |
| 6,497,010 | B1 | | 12/2002 | Klör et al. |
| 6,722,497 | B1 | * | 4/2004 | Pally et al. ................. 206/347 |

FOREIGN PATENT DOCUMENTS

| DE | 1913822 | 4/1965 |
| DE | 7234344 | 2/1972 |
| DE | 296 20 338 U1 | 3/1997 |
| DE | 196 42 157 C1 | 9/1997 |
| DE | 196 48 674 A1 | 5/1998 |
| DE | 100 31 000 A1 | 11/2001 |
| FR | 1508695 | 1/1967 |
| GB | 821955 | 10/1959 |

\* cited by examiner

*Primary Examiner*—David Bochna
(74) *Attorney, Agent, or Firm*—Friedrich Kueffner

(57) ABSTRACT

A device for holding hose clamps in a predetermined position, wherein the hose clamps each have a clamping part projecting radially away from a circumference of the hose clamps and wherein the clamping part has a projection extending in the circumferential direction, has a rail having a longitudinal slot for receiving the clamping part of the hose clamps via an open end of the longitudinal slot. The longitudinal slot has an edge configured to support the projection. The rail is a tube having an inner side projecting inwardly into a corner formed between the projection and an outer end section of the clamping part adjoining the projection.

4 Claims, 3 Drawing Sheets

DEVICE FOR HOLDING HOSE CLAMPS IN A PREDETERMINED POSITION

BACKGROUND OF THE INVENTION

1. Field of the Invention

The invention relates to a device for holding hose clamps in a predetermined position, wherein the hose clamps have a clamping part projecting approximately radially from their periphery and comprising a projection extending in a circumferential direction, wherein the hose clamps are, in particular, spring band clamps.

2. Description of the Related Art

A known device of this kind (DE 100 31 000 A1) is comprised of adhesive strips by which the hose clamps are adhesively connected coaxially and adjacent to one another in a row. Adhesive strips are a simple means for keeping the hose clamps together; however, in order to connect the hose clamps in a predetermined relative rotated angular position to one another by means of adhesive strips, the hose clamps must be arranged prior to this in their predetermined relative rotated angular position and secured in this position. This requires either a significant manual dexterity or an additional device in order to hold the hose clamps in the predetermined relative rotated angular position before adhesively connecting them by means of adhesive strips. The separation of the hose clamps from the adhesive strips, in particular, in order to position them individually in the predetermined rotated angular position in a mounting device, in particular, clamping pliers, requires a piece by piece separation of the strips for each hose clamp; this is time-consuming. Moreover, at least some of the adhesive generally remains attached to the hose clamp; this is undesirable.

SUMMARY OF THE INVENTION

It is an object of the present invention to provide a device of the aforementioned kind which is easier to handle.

In accordance with the present invention, this is achieved in that the device is a rail provided with a longitudinal slot and the hose clamps with their clamping part are inserted via an open end of the longitudinal slot into the longitudinal slot of the rail and are supported by means of their projection on an edge of the longitudinal slot.

According to this solution, the hose clamps can be suspended manually in a simple way sequentially in the slot of the rail. This rail reliably secures the hose clamps in their relative position, e.g., during transport. In order to prevent that they fall out of the longitudinal slot, the longitudinal slot is closed at one end and closable at the other end.

For removing the hose clamps, the hose clamps must only be pulled or pushed out of the longitudinal slot after the closure device has been opened or removed. It is also possible to insert the rail together with the hose clamps into an upright receptacle—such receptacles are used frequently in connection with mounting hose clamps in motor vehicles—and the hose clamps can then be individually removed from the lower end of the receptacle after the rail has been removed from the receptacle and inserted into a mounting device or pliers.

Preferably, the rail is a tube whose inner side projects inwardly into the corner formed between the projection and the outer end section of the clamping part adjoining the projection. Such a tube can be produced in a simple way and prevents relative rotation of the hose clamps without having to hold the rail horizontally for removal of the hose clamps in order for the hose clamps to rotate by means of their own weight into the predetermined relative rotated angular position.

Particularly, it can be ensured that the open cross-sectional area of the tube matches or complements the contour of the clamping part and its projection when viewed in the axial direction of the hose clamp. In this connection, the inner side of the tube, aside from play, rests against all wide sides of the clamping parts and their projections so that the hose clamps are rotatable relative to one another only within the range of the available play. Still, the diameter of the hose clamps can be almost of any size as long as the clamping parts and the projections are identical for all hose clamps.

When the pipe is primarily made of plastic material, it can be produced in a simple way.

In order to be able to remove any hose clamp individually from a row of hose clamps received in the tube without having to remove additional hose clamps from the tube, one embodiment of the device resides in that the plastic material is elastically bendable and the tube is provided on one lateral side adjoining the longitudinal slot with transverse slots opening into the longitudinal slot and having a spacing matching the axial width of the hose clamps. As a result of the bending capability of the plastic material, the lateral wall sections between neighboring transverse slots can be bent upwardly by the hose clamp positioned behind a particular lateral wall section for removing the hose clamp until the hose clamp can be removed freely.

DESCRIPTION OF THE PREFERRED EMBODIMENTS

Figure 1:
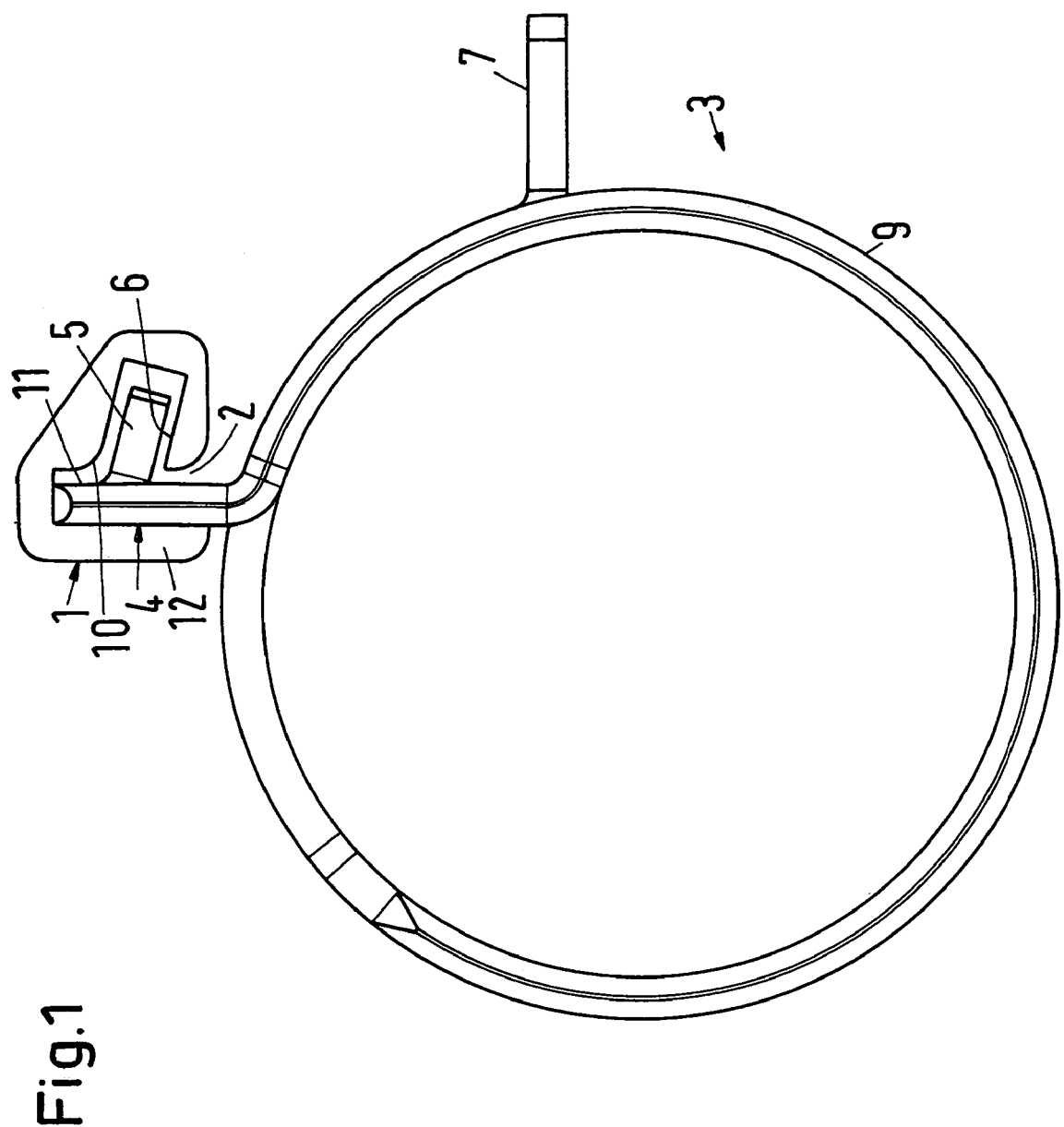
FIG. 1 is an end view of a first embodiment of the device according to the invention with hose clamps suspended therefrom wherein only one hose clamp is visible in this view.
Figure 2:
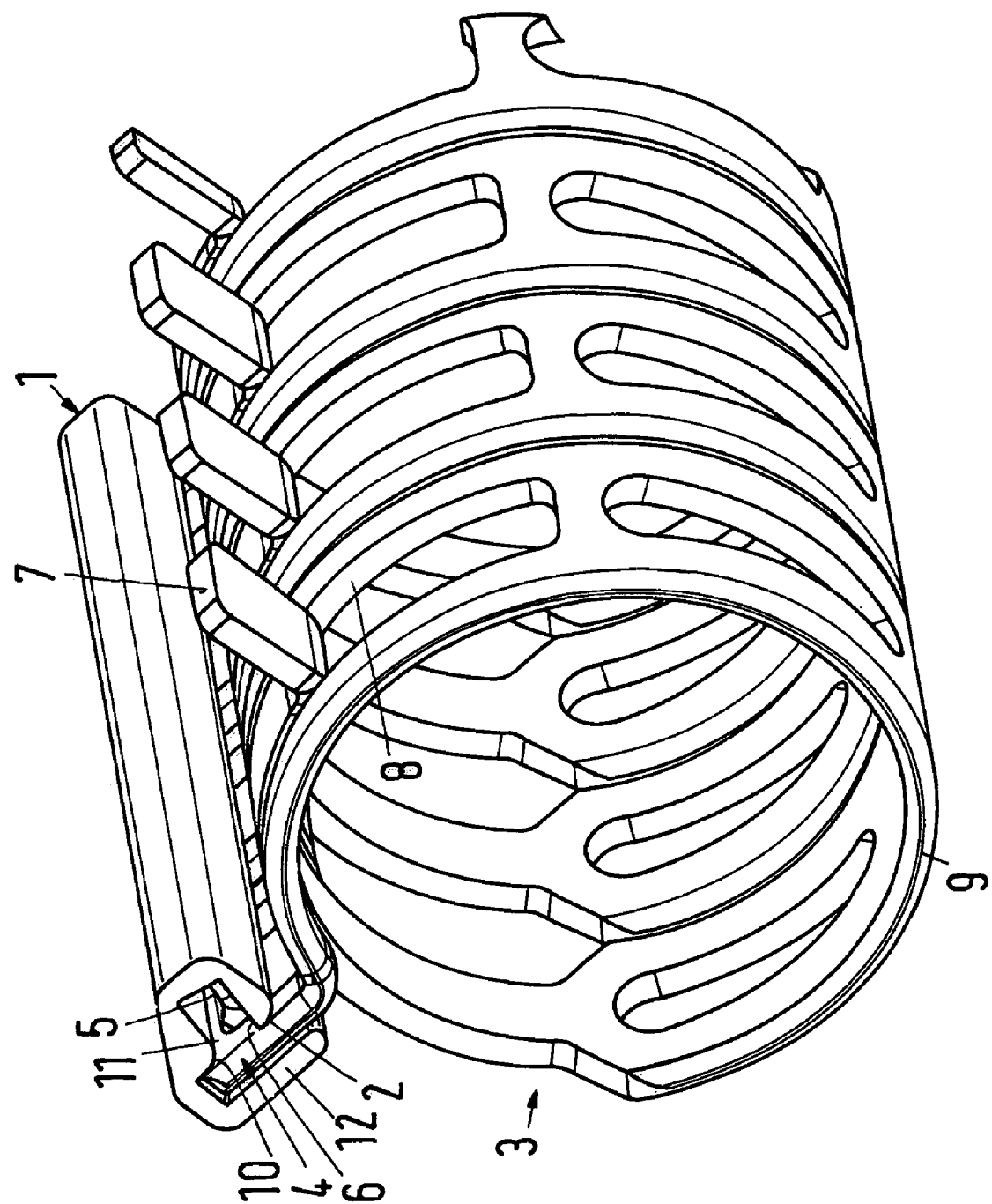
FIG. 2 is a perspective view of the device illustrated in FIG. 1 with hose clamps suspended therefrom.

The device illustrated in FIGS. 1 and 2 is a rail in the form of a polygonal tube 1 with longitudinal slot 2 into which the hose clamps 3, in the form of so-called spring band clamps, can be inserted from one end of the longitudinal slot with their clamping part 4 projecting radially from its circumference and having a projection 5 extending in the circumferential direction; the hose clamps are supported by the projection 5 on one edge 6 of the longitudinal slot 2. An additional clamping part 7 of the hose clamp 3 is formed on the end of the end section of the spring band 9 passing through the slot 8 of the spring band 9. The inner side 10 of the tube projects inwardly into the corner between the projection 5 and the outer end section 11 of the clamping part 4 adjoining the projection 5.

Overall, the open cross-sectional area of the tube 1 opposite the longitudinal slot 2 matches the contour of the clamping part 4 and its projection 5 when viewed in the axial direction of the hose clamp, wherein the side of the clamping part 5 facing away from the projection 5 is supported on the sidewall 12 which is planar.

The hose clamps 3 are all identical and have the same rotated angular position relative to one another within the tube 1. They can be easily inserted by hand with their clamping part 4 in the illustrated position from one end of the tube 1 into the longitudinal slot 2, i.e., into the tube 1. The end of the longitudinal slot 2 that is not visible in FIGS. 1 and 2 is closed and the visible end is closable by means of a closure device (not illustrated).

The hose clamps 3, suspended with their clamping part 4 in the longitudinal slot 2 of the tube 1, are not moveable relative to one another (aside from play) and maintain thus their relative rotated angular position during transport or manipulation of the tube 1.

In order to mount the hose clamps 3 on a hose to be clamped onto a tube socket or the like, the tube 1, with its open end leading, can be introduced together with the hose clamps 3 into an upright receptacle; after removal of the tube 1 from the receptacle, they can be individually removed from the receptacle and placed into a device or pliers for opening them or can be held in an open position, i.e., in the present case in a spread-apart state, and pushed across the hose before they are pushed, together with the hose, onto the socket.

The tubular holding device 1 is manufactured in a simple way of plastic material but can also be manufactured of metal.

Figure 3:
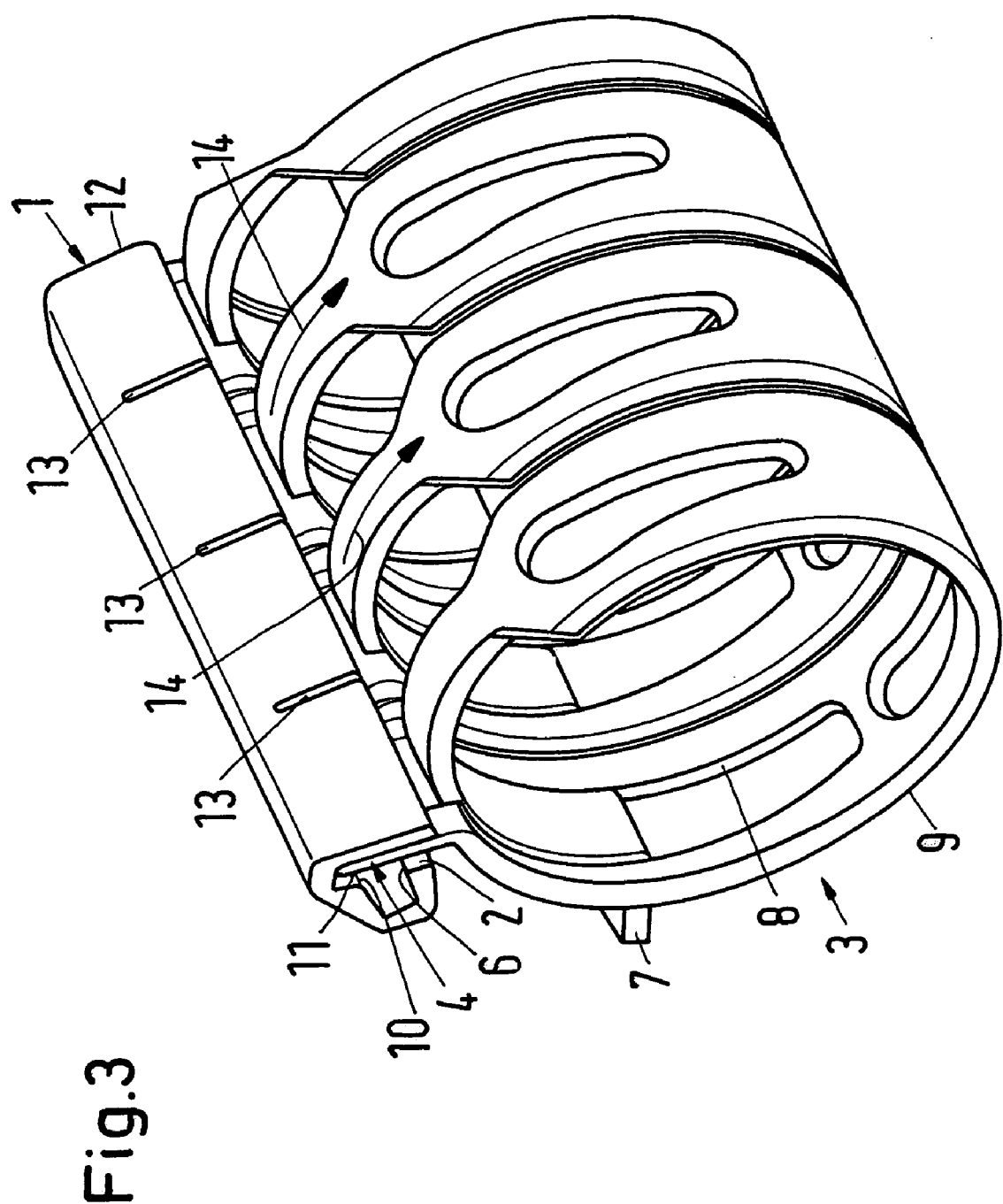
FIG. 3 is a second embodiment of the device according to the invention shown with suspended hose clamps.

The embodiment of the holding device illustrated in FIG. 3 is also a rail in the form of a tube 1 and differs from the device illustrated in FIGS. 1 and 2 only in that one sidewall 12, which adjoins the longitudinal slot 2, has transverse slots 13 opening into the longitudinal slot 2 and having a spacing matching the axial width of the hose clamps 3. The tube 1 is comprised of elastic bendable plastic material. The hose clamps 3 can therefore be individually removed in the direction of the arrows 14 by simultaneously opening the sections of the sidewall 12 between the transverse slots 13 without all hose clamps 3 having to be removed sequentially in the longitudinal direction of the tube 1.

While specific embodiments of the invention have been shown and described in detail to illustrate the inventive principles, it will be understood that the invention may be embodied otherwise without departing from such principles.

What is claimed is:

1. A device for holding hose clamps in a predetermined position, wherein the hose clamps each have a clamping part projecting radially away from a circumference of the hose clamps and wherein the clamping part has a projection extending in the circumferential direction, the device comprising:

a rail having a longitudinal slot configured to receive the clamping part of the hose clamps via an open end of the longitudinal slot, wherein the longitudinal slot has an edge configured to support the projection, wherein the longitudinal slot has an open cross-sectional area matching a contour of the clamping part and the projection when viewed in an axial direction of the hose clamp, and wherein the longitudinal slot is undercut, such that the longitudinal slot is comprised of a radially extending portion and a circumferentially extending portion wherein the radially extending portion extends radially beyond the circumferential portion.

2. The device according to claim 1, wherein the rail is comprised primarily of plastic material.

3. The device according to claim 2, wherein the plastic material is elastically bendable, wherein the rail has a sidewall adjoining the longitudinal slot, wherein the sidewall has transverse slots opening into the longitudinal slot, and wherein a spacing of the transverse slots relative to one another corresponds to an axial width of the hose clamps.

4. The device according to claim 1, wherein the open end of the longitudinal slot is closable and wherein the longitudinal slot has a closed end opposite the open end.

* * * * *